United States Patent [19]

Mehnert et al.

[11] Patent Number: 5,714,882
[45] Date of Patent: Feb. 3, 1998

[54] POSITION DETECTOR WITH NON-VOLATILE STORAGE FOR STORING POSITION DATA UPON FAILURE OF SUPPLY VOLTAGE

[76] Inventors: Walter Mehnert, Grillparzer Strasse 6, 85521 Ottobrunn; Thomas Theil, Alte-Traubinger-Strasse 5, 82340 Feldafing, both of Germany

[21] Appl. No.: 422,268

[22] Filed: Apr. 14, 1995

[30] Foreign Application Priority Data

Apr. 16, 1994 [DE] Germany .............. 44 13 281.6

[51] Int. Cl.⁶ .............. G01B 7/14; G01B 7/30; G01D 5/244; G01D 5/20
[52] U.S. Cl. .............. 324/207.15; 324/207.12
[58] Field of Search .............. 324/207.15, 207.25, 324/207.12, 207.11, 174; 365/228, 229; 307/66

[56] References Cited

U.S. PATENT DOCUMENTS

| | | | |
|---|---|---|---|
| 4,049,951 | 9/1977 | Baty et al. | 365/228 |
| 4,127,812 | 11/1978 | Baliguet | 324/174 |
| 4,560,887 | 12/1985 | Schnieder | 307/66 |

FOREIGN PATENT DOCUMENTS 4306487  9/1993  Germany.

*Primary Examiner*—Walter E. Snow
*Attorney, Agent, or Firm*—Sughrue, Mion, Zinn, Macpeak & Seas, PLLC

[57] ABSTRACT

A position detector with data evaluation circuit has at least one sensor which, in dependence on movement by which the position to be monitored alters, supplies electrical output signals to a circuit arrangement which produces there from a digital signal and puts it into intermediate storage until it is transferred to an evaluation unit. The digital signal reproduces in encoded form the position to be monitored. An energy converter converts a part of the kinetic energy of the movement into electrical energy and an energy storage means stores the electrical energy and provides same for supply to the circuit arrangement. A monitoring circuit outputs a control signal in response to a threatening drop in the supply voltage below a critical limit value. When the control signal occurs the digital signal is written into a non-volatile information storage means, in order thereby to make the position detector independent of an external power supply.

19 Claims, 2 Drawing Sheets

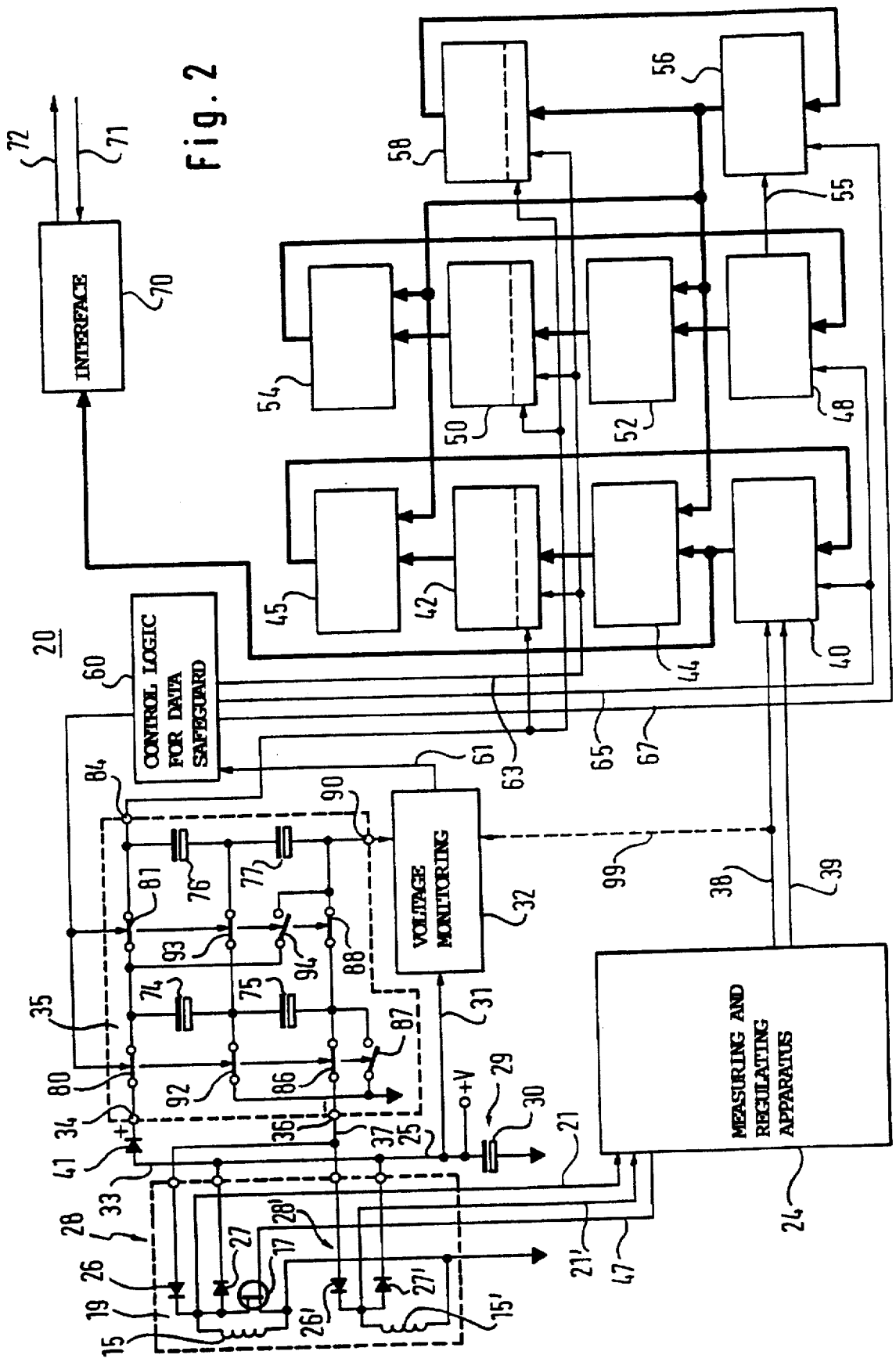

POSITION DETECTOR WITH NON-VOLATILE STORAGE FOR STORING POSITION DATA UPON FAILURE OF SUPPLY VOLTAGE

BACKGROUND OF THE INVENTION

The invention concerns a position detector with data evaluation circuit.

Position detectors are frequently used as what are referred to as intelligent measuring locations, that is to say, in the immediate spatial vicinity of one or more sensors generating electrical signals describing a movement or position to be monitored, the position detector includes a peripheral electronic evaluation and storage means with its own power supply, which serves to subject the signals generated by the sensor or sensors to a first processing procedure and to put the information obtained in that way into intermediate storage until it is called up by a user, for example a central measuring and evaluation unit.

A specific example in that respect is what is referred to as a multi-turn circuit in which at least one sensor generates an electrical signal whenever a rotatable shaft passes through a preselected angular position. The peripheral electronic system derives from those sensor signals a counting pulse which, possibly having regard to the direction of rotation of the shaft, changes the count value of a counter which is provided in the peripheral electronic system. That count value then represents the above-mentioned information which is put into intermediate storage and which can be called up by a user by way of an interface.

If the power supply for a peripheral electronic circuit of that kind fails, then the information stored therein is lost unless particular measures are taken to obviate that.

Those measures may be for example that the peripheral unit passes its items of information quickly to the central unit before its supply voltage has fallen to such an extent that data loss occurs. A prerequisite in that respect is that the system permits independent transmission of the information from the peripheral unit, and the central unit is quickly ready to receive the information at the appropriate critical time. Many systems fail to meet those requirements.

A further possibility involves giving the peripheral electronic system its own battery arrangement for the purposes of supplying power thereto, which batteries are always replaced by new batteries in good time before a critical fall in voltage occurs. That requires a high level of monitoring and maintenance expenditure which is undesirable and in many cases unacceptable.

SUMMARY OF THE INVENTION

An object of the present invention is to provide a position detector which is so designed that it is in principle independent of any external power supply.

Another object of the present invention is to provide a position detector such that even if an external power supply thereof fails for a long period of time the position detector continues to operate satisfactorily, thus obviating the need for battery power.

Still another object of the present invention is to provide a position detector responsive to a fall in supply voltage to provide energy conversion to maintain operation of the position detector.

In accordance with the present invention the foregoing and other objects are attained by the invention set forth herein.

As will be seen in greater detail from the following description of preferred embodiments of the invention, the present invention involves the use of an energy converter which is capable of branching off a part of the kinetic energy of the movement to be monitored by the position detector, and converting the branched-off part into an electrical current-voltage surge which contains sufficient electrical energy to ensure temporary power supply for all of the peripheral electronic system so that detection and partial processing of a signal which is descriptive of the position to be monitored as well as short-term intermediate storage of information are guaranteed.

In that respect the current-voltage surge generated by the energy converter, or a part thereof, can be the signal which is descriptive of the position to be monitored, or that signal can be generated by a sensor which is separate from the energy converter.

If then that electrical energy which has been supplied by the energy converter is suitably stored in an energy storage means contained in the peripheral circuit arrangement, it may be entirely adequate to maintain for a few seconds the operation of a circuit arrangement which is designed to afford a low level of current consumption.

If the motion to be monitored were to take place continuously at such a speed that the energy converter generates the next current-voltage surge and fully charges up the energy storage means again, before the supply voltage delivered by the latter has fallen too far, that arrangement would already be sufficient to attain the object of the present invention.

As however it is generally not possible to count on that being the case, the position detector further has a non-volatile storage means into which the information put into intermediate storage in the peripheral circuit arrangement is written, before the supply voltage has fallen to such an extent that that information is lost in the other circuit units, by means of which it is processed in regular operation and put into intermediate storage.

The drop in the supply voltage is monitored by means of a monitoring circuit which outputs a control signal for triggering a storage procedure when the voltage falls below a critical voltage limit value.

The underlying realisation of the present invention is thus that, by means of a suitable energy converter, for example as is described in detail in U.S. Ser. No. 08/352 101 U.S. Pat. No. 5,505,970), it is possible for all signal generation, processing and storage procedures, as are required for example in the case of a position detector such as a multi-turn circuit for ascertaining a coarse measurement value, to be fed from an energy component which can be derived from movements, even when they are very slow. If the movement comes to a complete halt, the positional information last obtained, which is secure in the non-volatile storage means, is not in any way altered, and the whole of the peripheral electronic system can transfer into a practically current-less and voltage-less rest condition. As soon as the movement begins again however and passes through a predetermined position, the energy converter again derives sufficient kinetic energy to ascertain at least one coarse value which is descriptive of the new position, and to store it reliably in the non-volatile storage means.

A certain difficulty arises with that structure out of the fact that the most appropriate non-volatile storage means which do not lose the information written into them, even in the event of a long-term failure in the supply voltage, are EEPRCM-storage means which permit only a limited number of writing operations. Admittedly that number is of the order of magnitude of same 100,000, but that would result in an unacceptably short operating life, if for example 100 writing operations had to be regularly carried out per second.

In order to avoid this problem, the frequency of the writing operations must be reduced as far as possible. For that purpose, the attempt is made on the one hand to charge the maximum amount of electrical energy into the energy storage means for each current-voltage surge, and on the other hand to use the stored energy as economically as possible by virtue of the choice of energy-saving circuits and components. Here however limits are very rapidly reached, particularly when the energy converter is required to be of a small size, so that at most it is possible to provide that, as already mentioned above, a current-voltage surge supplies energy for an operating period of a few seconds. If then, because of a correspondingly high speed in respect of the movement to be monitored, the current-voltage surges occur with such a density in respect of time that there is no threat of the supply voltage falling below the critical value, no storage procedures are required. If, in the reverse case, the intervals of time between the current-voltage surges and thus the phases of activity of the peripheral circuit arrangement are very great, a storage operation must admittedly be executed at the end of each such phase, but the number of storage operations per unit of time is still also small and a long operating life is not seriously endangered.

What is critical in contrast is a creeping or crawling movement in which the current-voltage surges occur with intervals of time which are slightly longer than the periods of time for which the energy which can be obtained from a current-voltage surge and stored can maintain regular operation. In that case, a writing operation must be performed in each case just before the next current-voltage surge, and if that happens every few seconds over long periods of time, then without further steps being taken, the operating life of the EEPRCM-storage means can be very quickly exhausted.

In order to provide a remedy in this respect, a further development of the present invention provides as a first step that a check is made by means of a suitable logic circuit prior to the execution of a writing operation for each individual storage cell to ascertain whether the logic value which is to be freshly written in ('1' or '0') is or is not equal to the stored value, a writing operation for the storage cell in question then being effected only when those two values are different.

If it is assumed that the logic values at the parallel outputs of a pure binary counter are to be written into the storage cells, a writing operation is therefore required for the cell which has to store the least significant bit, in the event of a threat of voltage loss, only when an odd number of counting pulses has occurred since the last writing operation. Therefore, the service life of the storage means is doubled in all the situations of use in which the probability of an even number of counting pulses occurring between two voltage failures is equal to the probability of the occurrence of an odd number.

Even if a marked increase in the length of the operating life can already be achieved in that way, there is still nonetheless the fact that, without additional measures being provided, the storage cells which are used for storage of the less significant bits are loaded by writing pulses more frequently than the storage cells for the more significant bits, the logic value of which changes substantially less frequently.

As storage means of the kind here in question however became inoperable when the most frequently loaded cell has passed beyond the maximum permissible number of writing operations, the present invention provides further measures for arriving at equidistribution which is as good as possible in respect of the writing operations to all the storage cells involved.

Those measures can provide that, after a predeterminable number of writing operations, the values of the storage cells are interchanged systematically, preferably cyclically.

A further possible configuration in this respect involves the provision of more writable storage cells than the counter whose counter condition is to be stored has parallel outputs, so that there is always a group of storage cells that remains unused. In this case also interchange can take place after a predeterminable number of writing operations so that previously unused storage cells are gradually brought into use and storage cells which have already been heavily used are shut down.

A third option in this respect involves supplying the storage means with the counter condition in an encoded form such that in regard to the mean in respect of time for the storage cells there is an approximately equally frequent change between logic '1' and logic '0'.

In order to arrive at a particularly long service life for the storage means, the above-mentioned arrangements may be adopted not just alternatively but also in conjunction with each other.

The consequence of the two arrangements last discussed above is that the counter condition which is contained in the respective counter in the event of a threat of voltage loss is written into the associated storage means in a modified form of representation, that modification being effected by means of an encoder. If then sufficient supply voltage is available again, the above-mentioned modification in the form of representation must be reversed before the counter condition stored in the storage means is written back. For that purpose the arrangement includes a decoder which operates on the basis of the same code as the above-mentioned encoder.

A further measure for increasing the length of the service life provides that a writing operation is not effected immediately upon any noticeable drop in the supply voltage. For that purpose, the arrangement operates with a supply voltage source, for example a capacitor, which under normal conditions supplies a substantially higher voltage than is required to maintain regular operation of the counter. Before that voltage has fallen to a predetermined fraction, for example 50%, of its regular value, a writing operation is triggered off. That has the advantage on the one hand that sufficient voltage is always available to be able to execute the writing operation in its entirety before data loss occurs. On the other hand, a time delay is indirectly provided, which, in all cases in which the voltage supply assumes its old value again before the expiry of the delay time, prevents any writing operation from taking place at all. That is of great significance in particular when the operating circumstances are likely to involve voltage failures which admittedly occur frequently but generally only last for a short period of time.

The above-described time delay can be afforded either by means of an oscillator with a counter connected on the output side thereof, or by means of a comparator for comparing the supply voltage which is actually present to a reference voltage.

Further objects, features and advantages of the present invention will be apparent from the following description of preferred embodiments thereof.

BRIEF DESCRIPTION OF THE DRAWING

FIG. 2 is a simplified block and signal diagram of a circuit arrangement belonging to a position detector according to the invention.

DESCRIPTION OF PREFERRED EMBODIMENTS

Figure 1:
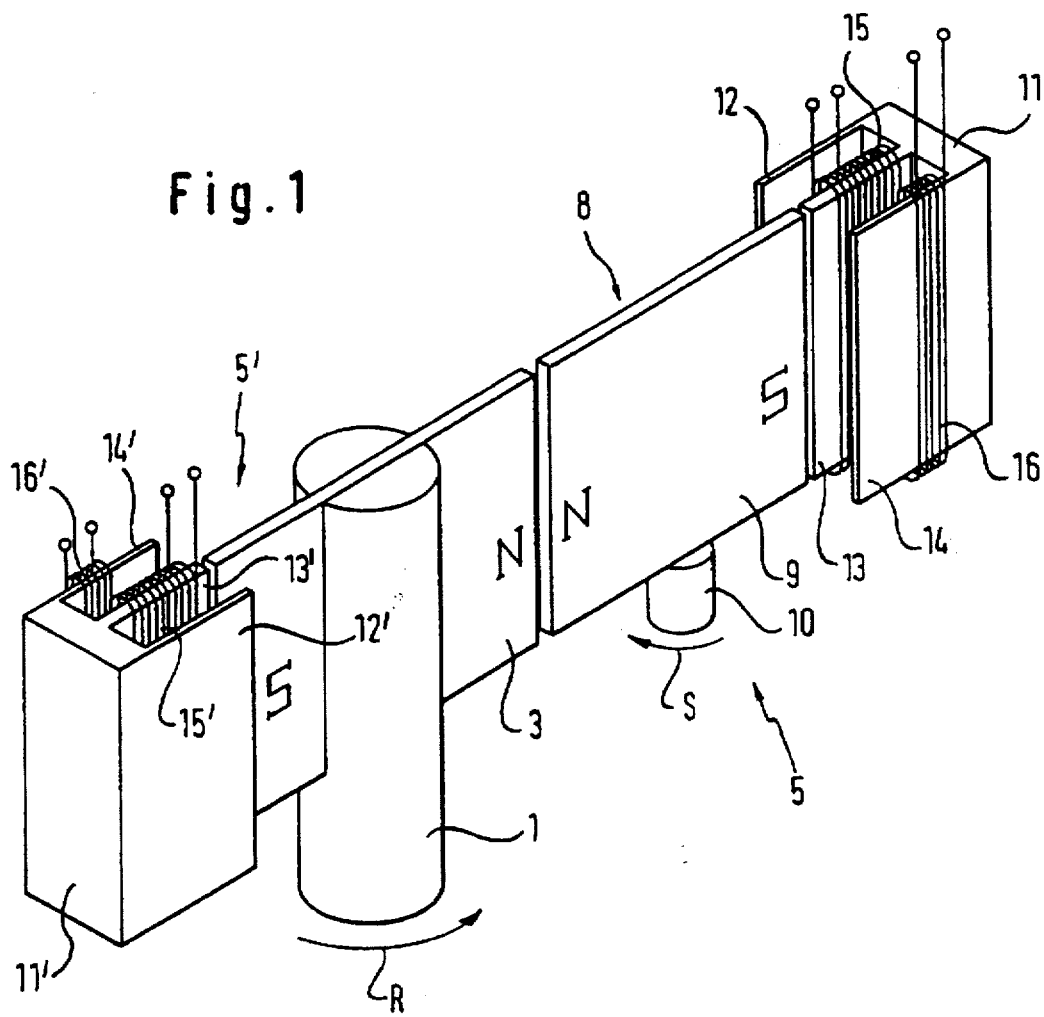
FIG. 1 is a diagrammatic perspective view of a position detector which is suitable for counting the revolutions and for detecting the direction of rotation of a shaft, having two energy converters which can take kinetic energy from the rotary movement of the shaft and convert it into electrical energy.

Referring firstly to FIG. 1, the position detector shown therein is based on the principle described in above-mentioned U.S. Ser. No. 08/352 101 (U.S. Pat. No. 5,505, 970), and the shaft even when the shaft 1 is performing extremely slow rotary movements, of outputting a damped oscillation signal which can be converted into a counting pulse, when the shaft 1 passes through a predetermined angular position. In that situation the above-mentioned oscillation signals always contain sufficient energy to supply a down stream disposed electronic evaluation system of suitable configuration with an adequate amount of electrical energy so that the electronic evaluation system can then also perform a counting operation and store the freshly obtained count value if otherwise no other supply source for electrical energy is available or if the regular electrical energy source has failed.

For that purpose a permanent magnet 3 is non-rotatably connected to the shaft 1 and is so oriented that its magnetic poles face radially outwardly. Furthermore the position detector illustrated in FIG. 1 has an energy converter 5 having an intermediate portion 8 with a permanent magnet 9 non-rotatably connected to a shaft 10 which is rotatable about an axis that is parallel to the axis of the shaft 1.

The permanent magnet 9 is also so oriented that the line connecting its poles extends radially with respect to the shaft 10. The spacing between the shafts 1 and 10 and the radial lengths of the magnets 3 end 9 are such that the radial end faces of the magnets 3 and 9 can move closely past each other.

Looking at the radius which extends from the axis of the shaft 1 and on which the axis of the shaft 10 is disposed, arranged still further outwardly is an E-shaped soft-iron core 11 which is so arranged that the three limbs 12, 13 and 14 of its E-shape are oriented inwardly towards the shaft 1, preferably in mutually parallel relationship. The middle limb 13 is disposed precisely on the above-mentioned radius while the to outer limbs 12 and 14 are disposed a few degrees of angle in front of and behind the middle limb 13 respectively, as considered in the direction of rotation of the shaft 10. The spacing of the E-shaped core 11 from the shaft 10 is such that the end faces of the poles of the permanent magnet 9, when it rotates about the axis of the shaft 10, can move at a small spacing past the radially inwardly facing end face of the middle limb 13. There must be a larger spacing relative to the outer limbs 12 and 14 so that the permanent magnet 9 which in principle is freely rotatable preferably occupies a starting position in which it is oriented radially towards the axis of the shaft 1 and 'clings' to the soft-iron core 11 by virtue of the magnetic field which is induced therein by the permanent magnet.

An induction coil 15 is wound on the middle limb 13 of the soft iron core 11 while the one outer limb 14 carries an auxiliary coil 16.

A further energy converter 5' is formed by an E-shaped soft-iron core 11' which is also arranged in such a way that its limbs 12', 13' and 14' are oriented inwardly towards the shaft 1, as was described above in regard to the core 11. In FIG. 1 the cores 11 and 11' are disposed in diametrally opposite relationship but that is not necessarily the case. It is possible to adopt any angular position in which the two arrangements do not interfere with each other.

To explain the mode of operation involved, consideration will first be directed to the energy converter 5. It is assumed in this connection that the permanent magnet 3 which is non-rotatably connected to the shaft 1, upon a movement of the shaft 1 in the direction indicated by the arrow R, has not yet reached the position shown in FIG. 1 but is at a position which is before that position and in which its North pole is increasingly approaching the North pole of the permanent magnet 9. In spite of the increasing repulsion forces between those two poles the permanent magnet 9 initially remains in its position in which its North pole is directed radially inwardly because its South pole remains 'clinging' to the iron core 11. As the North pole of the permanent magnet 3 further approaches the North pole of the permanent magnet 9, then, before the position shown in FIG. 1 which actually never occurs as a stable condition is reached, the shaft 1 reaches an angular position in which the repulsion forces between those two North poles become greater than the attraction forces between the permanent magnet 9 and the soft-iron core 11.

At that moment the permanent magnet 9 is strongly accelerated for a rotary movement in the direction indicated by the arrow S. Shortly after leaving the radially oriented starting position, not only the repulsion forces between the North pole of the permanent magnet 9 and the North pole of the permanent magnet 3 but also the attraction forces between the South pole of the permanent magnet 9 and the North pole of the permanent magnet 3 take effect. By virtue of that double force action, the permanent magnet 9 has reached a very high speed of rotation when its North pole reaches the core 11 of the induction coil 15 and moves past same.

The result of this is that the magnetic flux from the permanent magnet 9 firstly passes into the iron core 11 through the outwardly disposed limb 12 of the iron core 11 and then passes out of the iron core again essentially through the middle limb 13. The magnetic flux direction which is predetermined in that situation is abruptly reversed when the end face of the permanent magnet 9, which is towards the core 11, has travelled over the short arcuate distance between the outwardly disposed limb 12 and the middle limb 13. That produces a very high value of $d\phi/dt$, which for example generates a positive voltage pulse at the outputs of the induction coil 15. When the end face of the permanent magnet 9 then travels over the further short arcuate distance between the middle limb 13 and the other outwardly disposed limb 14 of the core 11, the magnetic flux direction in the core 11 reverses again so that now a negative voltage pulse of almost the same magnitude is induced.

When the end face of the permanent magnet 9 moves past the outer limb 14 of the core 11, a voltage pulse or surge is also induced in the auxiliary coil 16 which is wound on the limb 14. That voltage surge is at least sufficient to supply a signal for the electronic evaluation system. The moment at which that signal occurs, prior to or after the current-voltage surge in the induction coil 15, makes it possible to detect the direction of rotation of the permanent magnet 9 and therewith also the direction in which the shaft 1 rotated.

A to-and-fro swinging or oscillating movements of one of the ends of the magnet 9 in front of the limbs of the core 11 can also be detected in that way.

As soon as the induction coil 15 has outputted sufficient electrical energy to provide for signal evaluation and energy storage, its outputs can be short-circuited by the transistor indicated at 17 in FIG. 2, or connected together with a comparatively low resistance. In that way, the rotary movement of the permanent magnet 9, which otherwise would last for a prolonged period of time, is so strongly damped that its North pole moves only a short distance past the end face of the core 11, which faces towards it, in order then for the North pole of the permanent magnet 9 to move back into a position which is turned through 180° relative to the position shown in FIG. 1.

An important consideration here is that the above-described fast rotary movement of the permanent magnet 9 is substantially independent of the speed at which the shaft 1 and the permanent magnet 3 connected thereto move towards the predeterminable angular position, insofar as it does not fall below a minimun value. This therefore involves an energy converter which, even at extremely slow rotary movements of the shaft 1, takes a part of its kinetic energy and converts it into a current-voltage surge or pulse of comparatively high power, which not only supplies the electronic evaluation system with a signal for counting the revolutions of the shaft but also delivers an electrical energy supply which guarantees operation thereof for a certain period of time.

When the shaft 1 rotates through a further 180° in the direction indicated by the arrow R beyond the position shown in FIG. 1, the South pole of the permanent magnet 3 moves towards the South pole of the permanent magnet 9, which is now facing radially inwardly. If that rotary movement is continued, the same energy conversion procedure as has just been described above takes place. The only difference is that the voltage pulses induced in the induction coils 15 and 16 are of opposite signs.

The energy converter 5' does not have the intermediate portion 8. Therefore, when the shaft 1 is rotating very slowly, only weak current-voltage surges are induced in the coils 15' and 16' which are wound on the core 11', and those surges are generally not suitable as means for supplying energy for the electronic evaluation system.

However the situation is somewhat different when the shaft 1 is rotating very quickly. In that case it is possible that the permanent magnet 9 of the intermediate portion 8 may no longer be able to follow the movement of the shaft 1 and may possibly be almost stationary. In that case however the permanent magnet 3 moves past the soft-iron core 11' at such a high speed that a sufficiently high value of $d\phi/dt$ is generated in the coils 15', 16' and the current-voltage surges outputted by those coils are comparable to those described above in respect of the coils 15 and 16, and can be used in the same manner.

Looking now at FIG. 2, reference numeral 19 therein denotes the input stage of a circuit arrangement indicated generally at 20 for an electronic revolution counter, the input stage 19 including the two induction coils 15 and 15' of the position detector shown in FIG. 1.

One end of each coil 15 and 15' is connected to ground while the respective other end is connected on the one hand by way of a line 21, 21' to a measuring and regulating circuit 24 and on the other hand to two diodes 26, 27 and 26', 27' which respectively form full-wave rectifiers 28, 28'.

The positive outputs of the two rectifiers 28, 28' are connected to each other and by way of a line 25 to an energy storage means 29 formed by a capacitor 30, a line 31 to a voltage monitoring circuit 32, and a line 33 which includes a decoupling diode 41, to the positive input 34 of a capacitor arrangement 35.

The negative outputs of the rectifiers 28, 28' are also connected to each other and connected by way of a line 37 to the negative input 36 of the capacitor arrangement 35.

The side of the voltage supply capacitor 30 which is connected to the positive outputs of the rectifiers 28, 28' is connected to all corresponding supply voltage terminals of the circuit arrangements shown in FIG. 2, as is symbolically indicated by the connecting point +V. The lines which extend from sane to the circuit units have been omitted for the sake of enhanced clarity of the drawing.

As already mentioned above, disposed in parallel with the induction coil 15 is a transistor 17, by means of which the rotary movement of the permanent magnet 9 shown in FIG. 1 can be braked. The control signals required for that purpose are supplied to the transistor 17 from the measuring and regulating circuit 24 by way of the line 47.

The auxiliary coils 16 and 16' shown in FIG. 1 are not shown in FIG. 2, once again for the sake of enhanced clarity of the drawing. In actual fact however one end of the windings of each thereof is connected to system ground while the other end of their windings is connected to the measuring and regulating circuit 24 by way of a line corresponding to the lines 21, 21'.

In addition, two lines 38, 39 go from the measuring and regulating circuit 24 to a main counter 40 for counting the revolutions of the shaft 1 shown in FIG. 1. In that arrangement the line 38 which is connected to the clock input of the main counter 40 serves to transmit counting pulses, of which the measuring and regulating circuit 24 generates one for example whenever the permanent magnet 3 connected to the shaft 1 reaches an angular position in which it causes the permanent magnet 9, in the above-described manner, to rotate rapidly through 180° out of its rest position and in so doing generate in the coil 15 a current-voltage surge which comprises at least a positive and a negative half-wave. That oscillation signal is fed by way of the line 21 to the measuring and regulating circuit 24 which derives therefrom a counting pulse for the main counter 40.

On the basis of the sequence in which the above-mentioned oscillation signals occur at the induction coils 15, 16 and 15', 16' respectively, the measuring and regulating circuit 24 also forms a direction signal which is passed by way of the line 39 to the main counter 40 and causes the counter to increase or reduce its counter condition by a value of '1' whenever a counting pulse occurs on the line 38.

Such a configuration of the counter 40 is employed for example when a coarse measurement value in respect of the position of a carriage or slide of a machine tool or the like is to be obtained from the number of revolutions performed by the shaft 1, as in such situations it is important to detect the direction of rotation of the shaft 1. If on the other hand the situation only involves ascertaining the absolute number of revolutions performed by the shaft 1, in order for example to provide for monitoring the operating life or period of service of a component, the auxiliary coils 16 and 16' shown in FIG. 1 and the line 39 in FIG. 2 can be omitted and the main counter 40 can be in the form of a simple incrementing counter.

In any case the main counter 40 is so designed that it loses the counter condition contained therein when its supply voltage falls below a lower limit value. In order nonetheless not to lose the information which is afforded by that counter condition and in order to have that information available when a sufficient supply voltage is restored, the circuit arrangement 20 includes a main information storage means 42 which is in the form of an EEPROM and which does not lose an item of information contained therein even when it is not supplied with operating voltage for a very long period of time and whose parallel inputs are connected to the parallel outputs of the main counter 40 by means of multiple lines which are symbolically represented in FIG. 2 by wide lines, by way of an encoder 44, whereby the counter condition in the main counter 40 can still be written into the main information storage means 42 in good time if the voltage monitoring circuit 32 detects that the supply voltage is suffering from a critical fall.

So that the counter condition contained in the main information storage means 42 can be read into the main counter 40 again after restoration of an adequate supply voltage, the parallel outputs of the main information storage means 42 are connected by means of suitable multiple lines to the parallel inputs of the main counter 40, by way of a decoder 45 which reverses the modification, performed by the encoder 44, in the mode of representation of the counter condition, so that that counter condition is then available again in its original from and the main counter can continue to count possibly without any delay.

The circuit arrangement 20 further includes an auxiliary counter 48 which is designed as a pure incrementing counter and which, as will be described in greater detail hereinafter, increases its counter condition by a value of '1' for each writing operating with which a count value contained in the main counter 40 is transferred into the main information storage means 42.

As the counter condition of the auxiliary counter 48 also has to be retained in the event of a critical fall in the supply voltage, an auxiliary information storage means 50 which is in the form of an EEPROM is arranged on the downstream side of the auxiliary counter 48 in a corresponding manner to the main counter 40, in such a way that the parallel outputs of the auxiliary counter 48 are connected by way of an auxiliary encoder 52 to the parallel inputs of the auxiliary storage means 50 which also does not lose the information contained therein, over prolonged periods of time, even when no operating voltage is applied thereto. So that the information contained in the auxiliary information storage means 50 can be transmitted back into the auxiliary counter 48 in its original form when the supply voltage is restored, the parallel outputs of the auxiliary information storage means 50 are connected to the parallel inputs of the auxiliary counter 48 by way of an auxiliary decoder 54 which reverses the modification, effected by the auxiliary coder 48, in the mode of representation of the counter condition of the auxiliary counter 48.

Whenever the auxiliary counter 48 has reached a preselected counter condition and as a result outputs an overflow signal on the line 55, there is a change in the code with which the encoders 44 and 52 modify the form of representation of the counter conditions contained in the associated counters 40 and 48, and with which the decoders 45 and 54 reverse that modification. For that purpose the circuit arrangement 20 includes a code generator 56 which outputs a fresh code whenever it receives a corresponding con, hand signal from the auxiliary counter 48 by way of the line 55. In the simplest situation the code generator 56 is in the form of an incrementer which increases its counter condition by a value of '1' whenever the auxiliary counter 48 overflows.

As the code generator 56, like the two counters 40 and 48, is designed in the form of a circuit which loses the information stored therein in the event of an excessive fall in the supply voltage, the arrangement includes a second auxiliary information storage means 58 which is in the form of an EEPRCM and whose parallel inputs are connected directly to the parallel outputs of the code generator 56 and which, in the event of failure of the supply voltage, takes over the code last used and stores it until the supply voltage is restored. As that code is stored directly in the mode of representation used by the code generator 56, no decoder is required for the reverse transfer operation so that the parallel outputs of the second auxiliary information storage means 58 can be connected directly to the parallel inputs of the code generator 56.

Control of the writing operations with which the information contained in the counters 40 and 48 and the code generator 56 are transferred into the main information storage means 42 and the auxiliary information storage means 50, 58 respectively, and reverse transfer of those items of information out of the storage means 40, 50 and 58 into the counters 40, 48 and the code generator 56 is effected under the management of a control logic means 60 for safeguarding data, which on the one hand receives a control signal from the voltage monitoring circuit 32 by way of a line 61 whenever the supply voltage threatens to fall below a critical value, and which on the other hand is connected by way of a command line 63 to the 'write' inputs of the EEPRCM-storage means 42, 50 and 58, and a command line 65 to the 'preset' inputs of the main counter 40 and the auxiliary counter 48, and a command line 67 to the 'preset' input of the code generator 56.

So that the counter condition contained in the main counter 40 can be outputted to an external user, the parallel outputs of the main counter 40 are connected to a corresponding number of inputs of an interface which, whenever it receives a corresponding request signal from the user by way of the line 71, can for example serially output by way of the line 72 the information which is fed thereto in parallel.

The capacitor arrangement 35 includes two capacitors 74, 75 which are fixedly connected together in series and two capacitors 76, 77 which are also fixedly connected together in series. The one side of the series circuit consisting of the capacitors 74, 75 can be connected by way of a controllable switch 80 to the positive input 34 of the capacitor arrangement 35 and by way of a further controllable switch 81 to the positive output 84 of the capacitor arrangement 35, to which one side of the series circuit consisting of the capacitors 76, 77 is also fixedly connected.

The other side of the series circuit 74, 75 is connected by way of a controllable switch 86 to the negative input 36 of the capacitor arrangement 35, by way of a controllable switch 87 to system ground, and by way of a controllable switch 88 to the negative output 90 of the capacitor arrangement 35, to which the other side of the series circuit consisting of the capacitors 76, 77 is fixedly connected.

The connecting point between the two capacitors 74, 75 can be connected by way of a controllable switch 92 to ground and by way of a controllable switch 93 to the connecting point of the two capacitors 76 and 77. Finally the positive side of the series circuit 74, 75, which is connected to the switches 80, 81, can be connected by way of a controllable switch 94 to the negative side of the series circuit 76, 77.

The switches 80, 81, 86, 87, 88, 92, 93 and 94 are actuated simultaneously and jointly by the control logic means 60 in such a way that they can adopt two different switching states. In the first switching state which is shown in FIG. 2, the switches 80, 81, 86, 88 and 92, 93 are closed while the switches 87 and 94 are opened. In the second switching state in contrast the switches 80, 81, 86, 88 and 92, 93 are opened and the switches 87, 94 are closed.

The positive output 84 of the capacitor arrangement 35 delivers an increased writing voltage for the storage means 42, 50 and 58 while the negative output 90 is connected to the voltage monitoring circuit 32.

Figure 3:
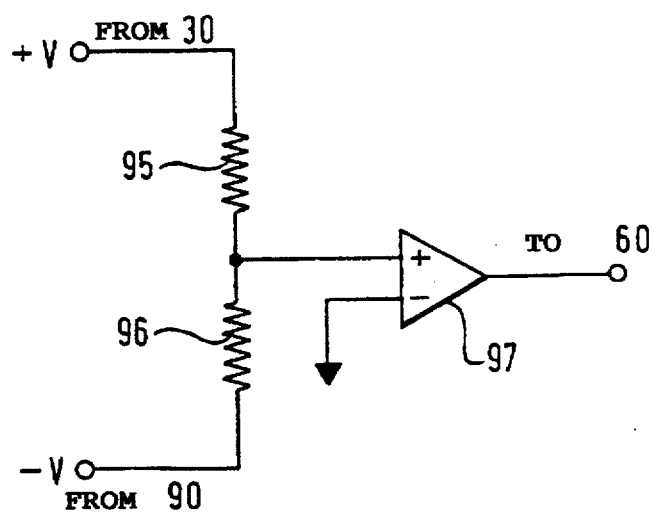
FIG. 3 is a view showing the principle of a voltage monitoring circuit with a voltage comparator.

Referring now to FIG. 3, the voltage monitoring circuit 32 diagrammatically shown therein includes a voltage divider comprising two resistors 95, 96, the resistances of which are for example in a ratio of 1:2. If then the supply voltage +V is applied to the positive input which is connected to the voltage supply capacitor 30 and the voltage −V which is initially of the same absolute value is applied to the input which is connected to the negative output of the capacitor arrangement 35, the connecting point of the resistors 95, 96, which is connected to the positive input of a comparator 97, is at a voltage which is V/3 above ground potential and becomes equal to 0 when the voltage at the positive input has fallen to half the value of the voltage at the negative input. The two resistors 95, 96 can be of very high resistance so that the comparator arrangement shown in FIG. 3 consumes only very little current. By way of the division ratio of the voltage divider 95, 96, it is possible to adjust the fraction of the voltage at the negative input, below which the voltage at the positive input must fall in order to cause the comparator 97 to respond.

In the description set out hereinafter of the mode of operation of the circuits shown in FIGS. 2 and 3, it is assumed that the capacitor 30 is the sole voltage supply source of the electronic assembly illustrated, and is always charged up to its maximum voltage again by the oscillation signals which are induced in the coils 15 and 15' respectively by the rotating shaft 1. In consideration of the mode of operation of the energy converter 5, which as indicated above is described in detail in above-mentioned U.S. Ser. No. 08/352 101 (U.S. Pat. No. 5,505,970), the current-voltage surges which are induced in the coils 15, or the oscillation signals which include at least one positive and negative half-wave, contain sufficient electrical energy for that charging-up effect even when the shaft 1 is rotating very slowly.

For charging up the capacitors 74 through 77, the switches 80, 81, 86, 87, 88, 92, 93, 94 are in the positions shown in FIG. 2 so that the capacitor 30 and the capacitors 74 and 76 are charged up to a voltage +V by the positive half-wave and the capacitors 75, 77 are charged up to the approximately equal voltage −V by the negative half-wave. Accordingly, the voltage 2V which is composed of the values +V and −V related to ground is dropped across the capacitor series circuits 74, 75 and 76, 77 respectively. With an energy converter which operates on the basis of the principle described with reference to FIG. 1, it is possible to achieve a maximum charging voltage for the capacitor 30, which is approximately twice as high as the critical limit $V_{min}$, below which the counters 40 and 48 and the code generator 50 threaten to lose the information stored therein.

As the capacitor 30 serves as a current supply source for the illustrated circuit units, after each charging operation the voltage which is dropped thereat continuously falls until the next charging operation while the voltages at the capacitors 74 and 76 which are decoupled by the diode 41 and the capacitors 75, 77 remain practically unaltered as all those capacitors are non-loaded during the switching condition shown in FIG. 2. Therefore as long as the shaft 1 is rotating at a sufficient speed or moves to and fro about a position in which the energy converter 5 is repeatedly subjected to pulse operation, the current supply for the entire circuit arrangement is safeguarded by the continual recharging of the capacitor 30 so that the main counter 40 can count the pulses which the measuring and regulating circuit 24 derives from the oscillation signals supplied by the induction coils 15, 16 and 15', 16' respectively and transmits to the main counter 40 by way of the line 38, having regard to the directional information which arrives by way of the line 39. If the external user feeds a request signal to the interface 70 by way of the line 71, the counter condition which the main counter 40 has respectively attained can be readily read out by way of the line 72. Storage of the counter condition contained in the main counter 40, in the main information storage means 42, does not occur as long as the voltage available at the voltage supply capacitor 30 does not fall below the value established by the ratio of the resistances of the resistors 95 and 96 as indicated in FIG. 3 of the voltage monitoring circuit 32.

If however the time interval between two successive oscillation signals in the coils 15 and 15' becomes so long that the supply voltage falls below the above-mentioned limit value, the comparator 97 of the voltage monitoring circuit 32 outputs a corresponding information signal to the control logic means 60 by way of the line 61. The control logic means 60 first opens the switches 80, 81, 92, 93, 86 and 88 and closes the switches 87 and 94 so that the voltage available thereto from the positive output 84 of the capacitor arrangement 35 assumes the value of +4V relative to ground. That quadrupled voltage is certain to be sufficient to be able to perform the three writing operations which are simultaneously caused to occur by the control logic means 60, by way of the line 63. In that situation the counter conditions of the main counter 40 and the auxiliary counter 48 as wall as the code contained in the code generator 56 are also written into the associated EEPRCM-storage means 42, 50 and 58 before the supply voltage has fallen to such an extent that the information contained in the counters 40, 48 and in the code generator 56 is lost.

The capacitor arrangement 35 which is not loaded by the regular current consumption of the circuit arrangement 20 therefore performs two functions here. It primarily serves as a writing energy storage means to ensure that adequate energy is always available if, just before a critical voltage drop, the information to be rescued has to be long-lastingly stored. In addition thereto it can advantageously be used as a reference voltage source which makes it possible to detect a critical fall in the supply voltage.

In situations in which the shaft 1 can move over long periods of time at a speed of rotation at which the current-voltage surges which charge the capacitor occur precisely with such a time interval therebetween that the supply voltage falls in a critical manner, the writing operations which are involved in that situation, involving writing into the EEPRCM-storage means 42, 50 may occur at a frequency such that, without additional measures being taken, the service life of the overall arrangement would be excessively curtailed as EEPROM-storage means are admittedly capable of maintaining information stored therein, without any change, over very long periods of time, even in the absence of a supply voltage, but they permit only a limited number of writing operations.

As a first step towards countering that problem, it is provided that a logic circuit indicated by a broken dividing line is disposed at the parallel inputs of each storage means 42, 50 and 58. The logic circuit may comprise for example a plurality of EXCLUSIVE-OR circuits with inverted output, each of which checks, for the associated storage cell, whether the binary value which is to be freshly written in is different from the binary value which is already stored therein, and by means of an AND-gate enables a writing operation only when that condition is met.

Since, as will be described in greater detail hereinafter, the code generator 56 changes the code that it delivers only after a large number of writing operations, the above-described measure is completely sufficient to guarantee a long service or operating life for the storage means 58.

In regard to the main counter 40 which counts each full revolution of the shaft 1 and the auxiliary counter 48 which increases its counter condition by the value '1' in each writing operation, at least the positions with the lower values or significances change their logic value very frequently, so that it is to be reckoned that the value to be stored is frequently different from the stored value.

In order nonetheless to permit a large number of writing operations to be performed and thus to achieve a long service life for the overall arrangement, the counter conditions contained in the counters 40 end 48 are not written directly in parallel into the storage means 42 and 50. On the contrary, interposed in each case is a respective encoder 44 and 52 which, under the control of the code generator 56, performs at least one but preferably both of the following functions:

1. The encoders 44 end 52 can be used to interchange the values or significances of the storage positions in the storage means 42 and 50, preferably in a cyclic manner, whenever the decoder 56 outputs a fresh code, that is to say when the counter 48 has counted a predetermined number of writing operations and has therefore outputted a corresponding control signal at its overflow output 55, so that for example the storage position with the previously lowest significance becomes the storage position with the highest significance and all other storage positions on the significance scale move by one step downwardly or vice-versa. This, in conjunction with the feature that a writing operation takes place only in those storage positions whose content differs from the value which is to be freshly written into the storage means, provides that all storage positions are approximately equally frequently written into.

2. Alternatively or in addition thereto, it can be provided that at least the auxiliary storage means 50 has more storage positions which are to be written in parallel, than the counter 48 has parallel outputs. In that case the encoder 52 can be used to modify the selection of the storage cells used for the storage procedure, out of the total available number of storage cells, in depended on the code generated by the code generator 56, whenever a given number of writing operations has taken place. Thus it can be provided for example that, when ten storage cells are required for storage of the information contained in the counter 48, the storage means 50 has twenty such storage positions, of which cells 1 through 10 are used during a first series of storage operations and cells 2 through 11 are used during a second series of storage operations, and so forth, until finally all twenty storage positions present have been used and have been subjected to the loading of an approximately equal number of writing operations. In addition thereto the first storage means 42 may also have a number of storage positions that is larger than the number required for storage of the counter condition of the counter 40. In that case the change in selection of the respective storage positions used is effected in a corresponding manner by means of the encoder 44.

As already mentioned the measures set forth above in 1. and 2. can be employed individually or both together, in which respect a particularly long service life can be attained in the latter case.

When the count values contained in the counters 40 and 48 are written into the storage means 42 and 50 in the mode of representation after modification by the encoders 44 and 52, a further drop in the supply voltage is harmless because the EEPRCM-storage means 42, 50 and 58 are readily capable of maintaining the information stored therein, even over long periods of time when there is no supply voltage.

When the induction coil 15 supplies a new current-voltage surge so that a sufficiently high supply voltage is again available for the circuit shown in FIG. 2, the control logic means 60 first passes a control pulse on the line 67 to the preset input of the code generator 56 which thereupon receives the code stored in the storage means 58 and applies it to the encoders 44 and 52 and the decoders 45 and 54. The control logic means 60 next passes a command pulse on the line 65 to the preset inputs of the counters 40 and 48 which thereupon take over the counter conditions which occur at their parallel inputs and which are identical to the counter conditions existing prior to the voltage failure and which are also in the correct mode of representation as the modification in the mode of representation which was effected in the preceding writing operation by the encoders 44 and 52 to prolong the service life of the storage means 42 and 50 has been reversed again by the decoders 45 and 54. It is only when that reverse transfer procedure is terminated that the count value of the storage means 48 is increased by '1', whereby the writing operation effected prior to the voltage loss is counted. That 'belated' counting operation is required so that, in the situations in which that counting operation results in overflow of the storage means 48 and thus a modification in the cede outputted by the code generator 56, the operation of returning to the counters 40 and 48 the counter conditions stored in the storage means 42 and 50 is conducted using the same code as that employed in the preceding writing operation.

That therefore ensures that the count values existing prior to the voltage loss are written unchanged into the counters 40 and 48 and those counters can continue to count in the proper fashion, starting from that basis. By virtue of making the charging voltage of the voltage supply capacitor 30 substantially greater than the critical voltage, being the lower voltage limit value at which the control logic means 60 triggers off a writing operation, a delay time is afforded in the sense that a writing operation does not have to be performed immediately upon any minor drop in the supply voltage. As in many situations of use the occurrence of stoppage times which are shorter than the above-mentioned delay time is more probable than the occurrence of stoppage times which are longer, the number of writing operations required is considerably reduced. That means that the service life of the storage means 40, 50 and 58 is correspondingly increased.

Instead of the comparator shown in FIG. 3, the voltage monitoring circuit 32 can use a timing member, for example an oscillator with an oscillation counter disposed on the output side thereof, in which case the reset input of that counter receives the pulses outputted by the measuring and regulating circuit 24 shown in FIG. 2, by way of a line 99 shown by a broken line in FIG. 2. As a charging operation for the capacitor 30 immediately preceeds each of those pulses, it is possible by means of the above-mentioned oscillator-counter assembly to define a period of time during which it can be assumed with certainty that an adequate supply voltage is available and no writing operation has to be performed. It is only when the counter which counts off the oscillations of the oscillator exceeds a predetermined count value that a suitable command signal is passed to the control logic means 60 by way of the line 61. However it will be noted that the current consumption of such an oscillator-counter assembly is higher than that of the high-resistance voltage divider 95, 96 and the comparator 97, and it is not possible to make use of the maximum period of time.

Another embodiment is of such a configuration that the energy converters 5 and 5' which are shown in FIG. 1 are only used to ensure a supply of electrical energy to the circuit arrangement shown in FIG. 2 at low or high speeds of rotation of the shaft 1, while the information about the revolutions of the shaft is obtained by means of an additional capacitive rotary sensor which consumes only very little electrical energy. That rotary sensor is then connected directly to the measuring and regulating circuit 24 which evaluates the signals supplied thereby, and outputs a counting pulse on the line 38 whenever a preselected angular position is detected by the rotary sensor. As the output signals of such a rotary sensor, which is of a known configuration, also permit detection of the direction of movement, the measuring and regulating circuit 24 can also derive from such signals the directional signal which is to be outputted on the line 39.

It will be noted that it is also possible to adopt design configurations in which only the energy converters 5 shown in FIG. 1, in which the auxiliary coils 16 and 16' have to be omitted for example for reasons of space, are used in conjunction with one of the above-mentioned capacitive rotary sensors. In that case the current-voltage surges outputted by the energy converters can be used both for charging the capacitor 30 and also for deriving a counting pulse in the above-described manner, while the information in respect of direction of movement is obtained by means of the signals of the capacitive rotary sensor which, in all situations in which the rotary movement of the shaft 1 does not take place in an extremely slow creep mode, makes it possible to conclude, by virtue of the fact that it delivers an absolute angular value of between 0° and 360°, whether the pulse last delivered by one of the energy converters was generated by the shaft 1 and therewith the permanent magnet 3 having rotated in the clockwise direction or in the counter-clockwise direction.

Although it has been initially assumed in the foregoing description that the capacitor 30 represents the sole power supply source for the circuit arrangement 20 illustrated in FIG. 2, that however is not necessarily the case. It is certainly possible to provide an external voltage/current source which is in parallel with the capacitor 30 and which generally supplies the circuit units with electrical energy. All the above-described operating procedures occur in that case when that external voltage/current source is switched off or fails for any reason. If that failure occurs when the shaft 1 is stationary, the voltage monitoring circuit again detects the potentially harmful drop in the supply voltage and causes the control logic means 60 to perform a writing operation, in the manner described hereinbefore. If then the shaft 1 is rotating while the external voltage supply has failed, an oscillation signal is generated whenever one of the ends of the permanent magnet 3 passes one of the energy converters 5 or 5', in the above-described manner. The signal produced not only supplies a counting pulse but also sufficient electrical energy to count that counting pulse and to store it in the non-volatile storage means 42 if the voltage falls further.

If in contrast the oscillation signals which are produced by a rotary movement of the shaft 1 occur with a sufficiently high frequency because the shaft 1 is rotating sufficiently rapidly, the supply of energy is guaranteed without interruption by the capacitor 30 and the main counter 40 can count the revolutions of the shaft 1 without a writing operation having to be performed on each occasion.

Those two modes of operation can be continued until the main power supply is working again and an uninterrupted supply of power for the circuit arrangement is guaranteed even when the shaft is rotating very slowly.

It has already been mentioned that it is advantageous, as an alternative or in addition to the measures described in detail hereinbefore, for the counter condition of the respective counter to be fed to the parallel inputs of the associated storage means in a form which is encoded in such a way that a change between logic '1' and logic '0' or vice-versa occurs for the maximum number of storage positions with a better equidistribution in respect of time and thus for the storage cells which are otherwise most heavily loaded, occurs considerably less frequently than is the case when using a pure binary cede.

That will be illustrated hereinbefore by reference to the example of a 2-bit binary counter. If the counter counts four pulses, starting from a counter condition of zero, then the following logic states occur in accordance with the regular binary code at its outputs $A_1$ and $A_2$:

| Counted pulse | Output $A_1$ | Output $A_2$ |
| --- | --- | --- |
| 0 | 0 | 0 |
| 1 | 1 | 0 |
| 2 | 0 | 1 |
| 3 | 1 | 1 |
| 4 | 0 | 0 |

Therefore a change in the logic value occurs four times at the output $A_1$ but only twice at the output $A_2$. This, in conjunction with the step of providing that a writing operation is operative only at the storage cells in respect of which the logic value which is to be freshly written into same is different from the value that is already stored, results in a loading which is twice as high on the storage cell associated with the output $A_1$.

If however the logic states fed to the storage means are encoded in the following manner:

| Counted pulse | Output $A_1'$ | Output $A_2'$ |
| --- | --- | --- |
| 0 | 0 | 0 |
| 1 | 1 | 0 |
| 2 | 1 | 1 |
| 3 | 0 | 1 |
| 4 | 0 | 0 | then a change in value for each storage cell occurs with equal frequency and the cell associated with the output $A_1'$ is loaded only half as severely, and that affords twice the service life length.

A corresponding consideration can also be demonstrated in relation to counters with a larger counting capacity.

It will be appreciated that the above-described structures according to the invention have been set forth solely by way of example and illustration of the principles thereof and that various modifications and alterations may be made therein without thereby departing from the spirit and scope of the invention.

It will further be noted at this point that the reference numerals contained in the appended claims serve for ease of interpretation thereof and are not intended to have restrictive effect.

What is claimed is:

1. A position detector comprising:

a sensor arrangement having at least one sensor adapted to supply electrical output signals in dependence on movement performed by one of two bodies whose mutual position is to be monitored with respect to the other;

an electronic circuit arrangement for preprocessing the sensor signals to generate a digital signal containing in encoded form the information describing the position to be monitored, and for putting said digital signal into intermediate storage until it can be transmitted for further processing to an evaluation unit;

an energy conversion means for branching off a part of the kinetic energy of said movement and converting said part into an electrical current-voltage surge containing sufficient electrical energy to ensure temporary power supply for said electronic circuit arrangement even if said movement is extremely slow;

an energy storage means for storing the electrical energy outputted by the energy conversion means and making it available for the current/voltage supply for the electrical circuit arrangement;

a monitoring circuit for detecting the approach of the supply voltage delivered by the energy storage means to a critical voltage limit value such that when the delivered supply voltage falls below said voltage limit value the circuit arrangement loses information contained in the digital signal in intermediate storage, and outputting a control signal before said supply voltage falls below said voltage limit value, and a non-volatile information storage means into which the digital signal is read whenever the monitoring circuits produces the control signal.

2. A position detector as set forth in claim 1 wherein the energy conversion means (5, 5') includes at least one induction coil (15, 15') in which a current-voltage surge is induced when one of said two bodies relative to the other passes through a predetermined position, and wherein the energy storage means (29) includes at least one capacitor means (30) which is charged up by said surge to a voltage which serves as a supply voltage for the circuit arrangement (20).

3. A position detector as set forth in claim 2 including a further capacitor arrangement (35) which is charged up by said surge to a voltage which does not serve as a regular supply voltage for the circuit arrangement (20).

4. A position detector as set forth in claim 2 wherein the monitoring circuit (32) includes a timing member which begins a time measurement operation whenever a current-voltage surge which is induced in the induction coil (15, 15') occurs, and means for producing a control signal for writing of the digital signal into the non-volatile information storage means (42) whenever the measured time exceeds a predeterminable time limit value.

5. A position detector as set forth in claim 3 wherein the monitoring circuit (32) includes a timing member which begins a time measurement operation whenever a current-voltage surge which is induced in the induction coil (15, 15') occurs, and means for producing a control signal for writing of the digital signal into the non-volatile information storage means (42) whenever the measured time exceeds a predeterminable time limit value.

6. A position detector as set forth in claim 3 wherein said monitoring circuit (32) includes a voltage comparator (97) adapted to compare a varying supply voltage provided by the energy storage means (29) to the voltage which is provided by the further capacitor arrangement (35) and which remains substantially unchanged during regular operation, in order to detect the approach of said supply voltage to said critical voltage limit value.

7. A position detector as set forth in claim 3 wherein the electrical energy stored in the further capacitor arrangement (35) is operative for writing the digital information into the non-volatile information storage means (42).

8. A position detector as set forth in claim 7 wherein said further capacitor arrangement (35) comprises a plurality of capacitors (74, 75, 76, 77) and a plurality of controllable switches (80, 81, 86, 87, 88, 89, 90, 92) operable to connect the capacitors (74, 75, 76, 77) in parallel with each other for the charging operations by current-voltage surges induced in the induction coil (15, 15') and to connect the capacitors in series with each other for the writing operations for producing an increased writing voltage.

9. A position detector as set forth in claim 1 wherein the circuit arrangement (20) includes a first counter means (40) whose counter condition represents the digital signal containing the information describing in encoded form the position to be monitored, wherein the counter means (40) has parallel outputs at which its counter condition occurs in binary ceded form, and wherein the non-volatile information storage means (42) has parallel inputs connected to the parallel outputs of the counter means (40) whereby the instantaneous condition of the counter means (40) can be reed into the storage means when the control signal from monitoring circuit (32) occurs.

10. A position detector as set forth in claim 9 wherein the non-volatile information storage means (42) is of such a nature as to permit only a limited number of writing operations, and further including control means operable to provide that in each writing operation only those ones of its storage positions are written to which contain a logic value that is different from the logic value which results for the respective storage position from the counter condition which is to be written in.

11. A position detector as set forth in claim 10 including an interchange circuit (44) operable after a predeterminable number of writing operations to interchange the significances of storage positions of the storage means in such a way that hitherto frequently written-to storage positions are written-to less frequently on a statistical mean and hitherto less frequently written-to storage positions ere written-to more frequently on a statistical mean and including a first feedback circuit means (45) operable when the required supply voltage is restored for transmission of the counter condition stored in the information storage means (42) back to the counter means (40) by a procedure whereby said interchange is reversed.

12. A position detector as set forth in claim 11 including means for effecting said interchange in respect of the storage positions cyclically by a procedure whereby in each case the respective storage position with the highest significance becomes the storage position with the lowest significance while all other storage positions move upwardly by one step.

13. A position detector as set forth in claim 11 including means for effecting said interchange in respect of the storage positions cyclically by a procedure whereby in each case the respective storage position with the lowest significance becomes the storage position with the highest significance while all other storage positions move downwardly by one step.

14. A position detector as set forth in claim 11 including an auxiliary counter means (48) for detecting the attainment of said predetermined number of writing operations, the auxiliary counter means (48) being operable to reset itself upon overflow, a non-volatile auxiliary information storage means (50) of a nature such as to permit only a limited number of writing operations, an auxiliary interchange circuit (52) operable to cause the counter condition of said auxiliary counter means (48) to be written into said auxiliary information storage means (50) in the same manner as in relation to the first counter means (40) and an auxiliary feedback circuit means arranged downstream of the auxiliary information storage means (50) in the same manner, the arrangement being such that each writing operation involves writing in the auxiliary information storage means (50) only into those storage cells thereof that contain a logic value that is different from the logic value which arises for the respective storage position out of the auxiliary counter condition which is to be written in.

15. A position detector as set forth in claim 14 wherein both said interchange circuit and said auxiliary interchange circuit are each formed by a respective encoder (44 and 52) disposed between the parallel outputs of the first counter means (40) and the auxiliary counter means (48) respectively and the parallel inputs of the information storage means (42) and the auxiliary information storage means (50) respectively, wherein both the first feedback circuit means and the auxiliary feedback circuit means are each formed by a respective decoder (45 and 54) disposed between the parallel outputs of the information storage means (42) and the auxiliary information storage means (50) respectively and the parallel inputs of the counter means (40) and the auxiliary counter means (48) respectively, and further including a code generator (56) operable to actuate the encoders (44, 52) and the decoders (45, 54), the code generator(56)altering the code whenever the predetermined number of writing operations has been reached, and including a second non-volatile auxiliary information storage means (58) of such a nature as to permit only a limited number of writing operations and operable for storage of the code generated by the code generator (56) when the monitoring circuit (32) has detected a threat of the supply voltage falling below the preselected voltage limit value.

16. A position detector as set forth in claim 15 wherein at least the auxiliary information storage means (50) includes more storage cells than the auxiliary counter means (48) has parallel outputs, and further including a selection circuit operable after a predeterminable number of writing operations to change the selection of the storage positions used for storage out of the overall number of available storage positions, and further including a selection reversal circuit operable when the required supply voltage is restored for transfer of the counter condition stored in the auxiliary storage means (50) back into the auxiliary counter means (48) by a procedure whereby the respectively selected storage positions are connected to the parallel inputs of the auxiliary counter means (48).

17. A position detector as set forth in claim 16 wherein the encoder (52) serves also as the selection circuit and the decoder (54) serves also as the selection reversal circuit.

18. A position detector as set forth in claim 9 wherein the main counter means (40) is operable to count pulses, each of which is derived from a respective current-voltage surge produced in an induction coil (15, 15) of the energy conversion means (5, 5').

19. A position detector as set forth in claim 18 wherein at least one of the storage means (42, 50, 58) receives the counter conditions of the associated counter means (40, 48, 56) in encoded form in such a way that the frequency with which individual storage cells change their logic value is more uniformly distributed than in the case of a pure binary code.

* * * * *